Dec. 9, 1941.  E. R. JACOBI  2,265,562
RIM
Filed Jan. 22, 1940   2 Sheets-Sheet 1
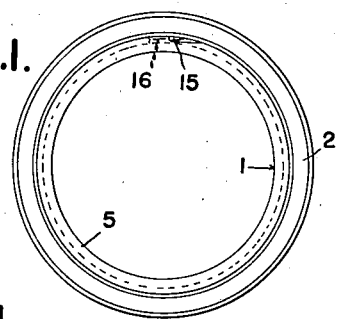
FIG.1.
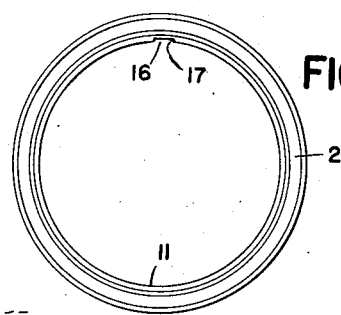
FIG.2.
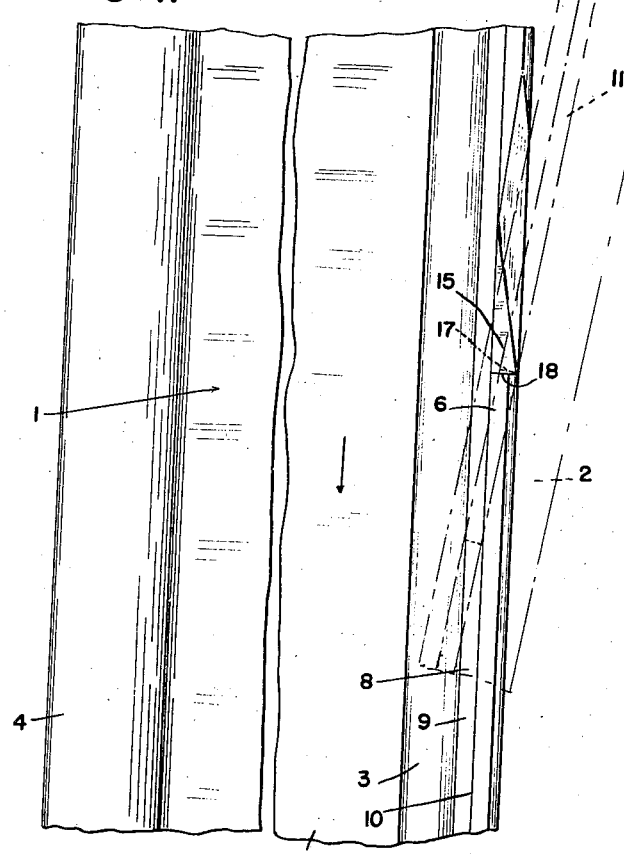
FIG.4. FIG.3.
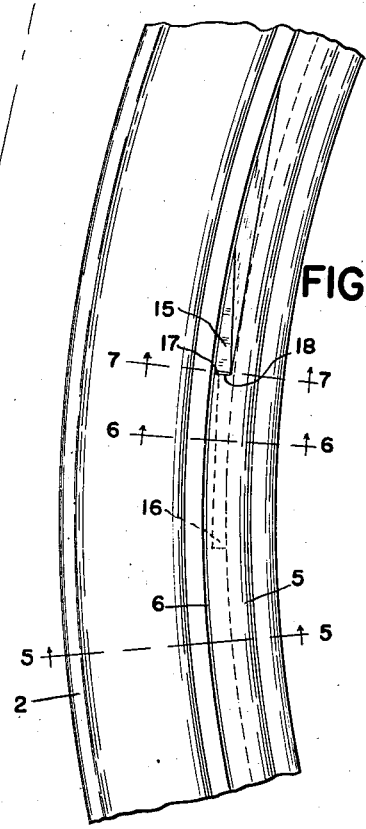
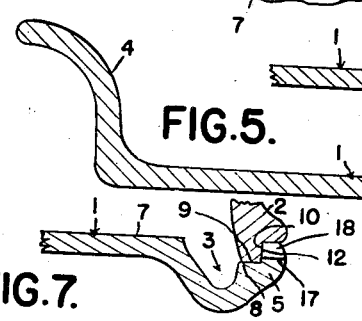
FIG.5. FIG.6. FIG.7.
INVENTOR.
EMIL R. JACOBI
BY
ATTORNEYS Dec. 9, 1941.　　　　E. R. JACOBI　　　　2,265,562
RIM
Filed Jan. 22, 1940　　　　2 Sheets-Sheet 2

INVENTOR.
EMIL R. JACOBI
BY
ATTORNEYS

Patented Dec. 9, 1941

2,265,562

UNITED STATES PATENT OFFICE 2,265,562

RIM

Emil R. Jacobi, Detroit, Mich., assignor to Kelsey-Hayes Wheel Company, Detroit, Mich., a corporation of Delaware Application January 22, 1940, Serial No. 315,099

8 Claims. (Cl. 152—411)

The invention relates to rims and refers more particularly to vehicle wheel tire carrying rims of that type having an endless rim base and a detachable endless tire retaining ring.

The invention has for an object to provide an improved construction of rim having an endless rim base and an endless tire retaining ring constructed to facilitate application and removal of the tire and the ring and to effectively prevent accidental disengagement thereof.

The invention has for another object to provide an improved construction of rim in which the rim base and the ring are each provided with a notch to facilitate assembly and the depth of each notch is such that the parts of the rim base and ring at the bottoms of their respective notches are opposed to and adapted to engage the ring and rim base respectively. In other words, the construction of rim provides for assembly and also provides for retaining engagement throughout the circumferential extents of the rim base and ring.

The invention has for another object to construct the rim base with an annular well into which the tire beads can be moved to permit application and removal of the tire to and from the rim base, a generally radially outwardly extending flange at one edge, and an immediately adjacent annular shoulder engageable with the ring, the portion of the rim base immediately adjacent the annular shoulder being of smaller diameter to facilitate application and removal of the ring.

The invention has for further objects to form the annular shoulder so that its width is substantially the same as the width of the inner edge of the tire retaining ring; to form an annular groove in the rim base immediately adjacent the annular shoulder having a width sufficient to receive the tire retaining ring, but less than that of the bead seat adjacent the annular shoulder; and to provide cooperating means on the annular shoulder and tire retaining ring to prevent creeping of the latter relative to the former.

These and other objects of the invention will become apparent from the following description, taken in connection with the accompanying drawings, in which—

Figure 1 is a side elevation of a rim embodying my invention;

Figure 2 is a side elevation of a tire retaining ring embodying my invention;

Figure 3 is an enlarged view of a portion of Figure 1;

Figure 4 is an enlarged plan view of a portion of the rim base;

Figure 8:
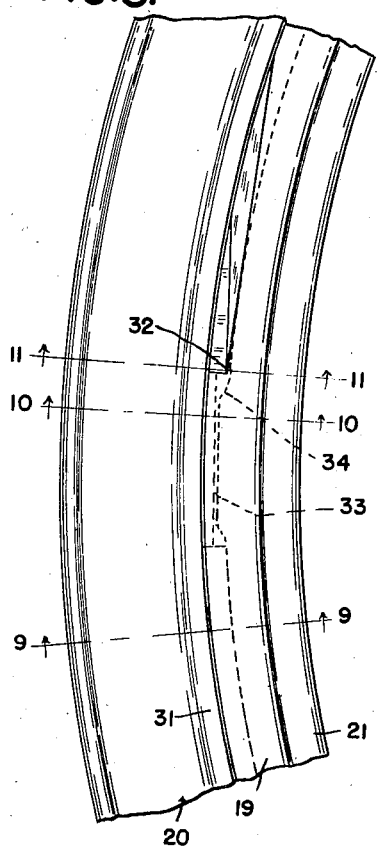
Figure 11:
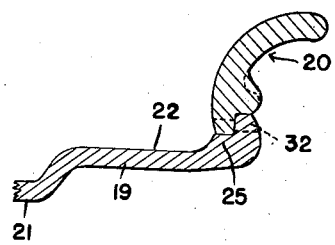
Figure 10:
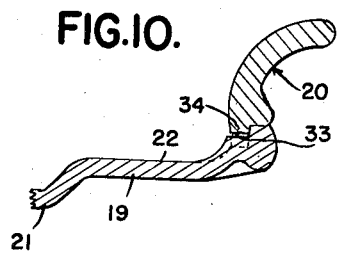
Figure 9:
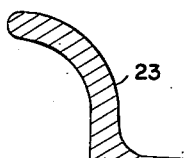
Figure 9:
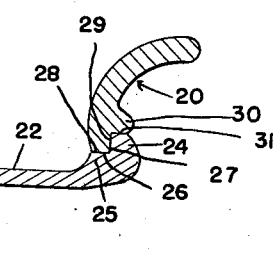
Figure 12:
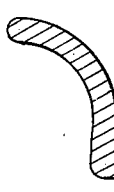

Figures 5, 6 and 7 are cross sections on the lines 5—5, 6—6 and 7—7, respectively, of Figure 3;

Figure 8 is a view similar to Figure 3 showing another embodiment of my invention;

Figures 9, 10 and 11 are cross sections on the lines 9—9, 10—10 and 11—11, respectively, of Figure 8;

Figure 12 is a view similar to Figure 9 showing another embodiment of my invention.

As illustrated in Figures 1 to 7 inclusive, the rim comprises the endless metal rim base 1 and the detachable endless metal tire retaining ring 2. The rim base is provided at one edge with the circumferentially extending gutter 3 and at the other edge with the tire retaining flange 4. The outer wall of the gutter terminates in the generally radial flange 5 which has at its edge the face 6 of an external diameter substantially equal to, but preferably slightly less than the external diameter of the cylindrical portion 7 of the rim base. The outer wall of the gutter is preferably formed on its inner side with the enlargement 8 producing the annular shoulder 9 which is substantially midway between the bottom of the gutter and the face 6, but preferably nearer the latter than the former. The flange has the inner radial face 10 which extends from the shoulder 9 to the face 6.

The tire retaining ring 2 has an internal diameter less than the external diameter of the flange and slightly greater than the distance from the bottom of the gutter to the diametrically opposite part of the face 6 of the flange. The ring has the generally radial base portion 11 provided with a radial outer face 12 adapted to engage the inner face 10 when the ring is assembled with the rim base, the base portion and the flange forming cooperating retaining portions for normally preventing removal of the ring from the rim base. The ring also has the lateral portion 13 which is provided with an annular face 14 adapted to engage and seat on the face 6 when the ring is assembled on the rim base.

To provide for assembly of the tire retaining ring 2 with the rim base 1, the flange 5 is formed with the peripherally extending notch 15 in its periphery and the base portion 11 is formed with the peripherally extending notch 16. The notches 15 and 16 form radial reliefs. During the initial assembly of the tire retaining ring with the rim base the substantially radial end 17 of the notch 16 extends adjacent to the substantially radial end 18 of the notch 15 and is adapted to prevent movement of the ring relative to the rim base in a counterclockwise direction, as viewed in Figure 1, the part of the base portion adjacent the notch 16 engaging the notch 15. The position of the parts at this time is indicated in Figure 4, the ring being shown in dot-dash lines. The assembly is completed by peripherally progressively moving the base portion 11 over the flange 5 in the direction of the arrow in Figure 4, or in a counterclockwise direction, as viewed in Figure 1, during which time the ring is slightly sprung or distorted. During the final portion of the assembly the base portion of the ring snaps completely into place inside the flange, there being a slight peripheral movement of the ring in the direction of the arrow in Figure 4 relative to the rim base. As a result, when the ring is forced laterally outwardly over the annular shoulder 8 as by the tire, which is inflated after the assembly of the ring on the rim base, there is no continuous opening through the flange and the base portion to permit water, dirt, and the like, passing therethrough. It will be noted that the width of the inner edge of the base portion of the ring is substantially the same as that of the annular shoulder of the rim base.

The depths in a radial direction of the notches 15 and 16 and also their peripheral extents, while being sufficient to permit assembly of the ring 2 with the rim base 1, are less than the depths of the flange 5 and the base portion 11, respectively. As a result, when the ring is in place on the rim base the parts of the flange and base portion at the bottoms of the notches are opposed to and adapted to engage the registering parts of the base portion and flange, respectively, so that the retaining portions of the rim base and ring are adapted to engage throughout their complete circumferential extents. By reason of this construction the rim is strong and substantial and can easily withstand the stresses to which it is subjected.

The tire retaining ring may be readily detached or removed from the rim base when the tire is deflated by inserting a tool, such as a screw driver, over the flange 5 into the notch 16 of the ring and then prying the portion of the ring in this zone over the flange while the diametrically opposite portion of the ring is located in and engages the bottom of the gutter. After the portion of the ring in the zone of the notch 16 has been pried over the flange, peripherally successive portions of the ring may be readily pried over the flange until the ring can be removed by hand. This operation is facilitated by reason of the internal diameter of the ring being slightly greater than the distance from the bottom of the gutter to the diametrically opposite part of the periphery of the flange.

As illustrated in Figures 8 to 11 inclusive, the rim comprises the endless metal rim base 19 and the detachable endless metal tire retaining ring 20. The rim base, as illustrated, is of the drop-center type and is provided with the central annular well 21, the tire bead seats 22 at opposite sides of the well, and the relatively high tire retaining flange 23 at one edge. The rim base is formed at the other edge with the relatively low marginal flange 24 which extends generally radially outwardly so that its outer diameter is greater than that of the adjacent bead seat 22. The rim base is further provided with the annular enlargement 25 immediately adjacent the flange 24 and producing the annular shoulder 26 which is substantially midway between the adjacent bead seat 22 and the outer edge of the flange 24, but preferably nearer the latter than the former. The flange 24 has at its inner side the radial face 27 which extends from the annular shoulder 26 to the outer edge of the flange.

The tire retaining ring 20 has an internal diameter less than the external diameter of the flange 24 and slightly greater than the distance from the adjacent bead seat 22 to the diametrically opposite part of the outer edge of the flange. The ring has the base portion 28 of substantially the same width as the annular shoulder 26 and provided with a radial outer face 29 adapted to engage the inner face 27 of the flange when the ring is assembled with the rim base, the base portion and the flange forming cooperating means for retaining the ring on the rim base. The ring also has the lateral portion 30 provided with an annular face 31 which is adapted to engage and seat on the outer edge of the flange 6 when the ring is assembled on the rim base.

The rim base being provided with the well into which the beads of the tire can be moved, provides for ready mounting or removal of the tire when the tire retaining ring is removed from the rim base.

To provide for assembly of the tire retaining ring 2 with the rim base 1 independently of the well, the marginal flange 24 is formed with the peripherally extending notch 32 in its periphery and the base portion 28 of the ring is also formed with the peripherally extending notch 33. The annular enlargement 25 is preferably formed with the radially outwardly extending projection 34 beyond the annular shoulder 26 and located adjacent to the notch 32 in a position to register with the notch 33 both during the initial assembly of the ring on the rim base and when the ring is in position on the rim base. This projection thus cooperates with a substantially radial end of the notch 33 during the initial assembly of the ring to prevent movement thereof relative to the rim base in one peripheral direction and at the same time the other substantially radial end of the notch 33 cooperates with the substantially radial end of the notch 32 to prevent movement of the ring relative to the rim base in the other peripheral direction. As a result, during the initial application peripheral movement of the ring in both directions is limited. Furthermore, when the ring is in its final assembled position the projection serves to prevent creeping of the ring relative to the rim base.

The notches 32 and 33 are formed in the same manner as the notches 15 and 16, respectively, and the ring 20 is assembled on and removed from the rim base 19 in the same manner as the ring 2 on the rim base 1, with the exception that use is made of the portion of the tire bead seat 22 immediately adjacent the annular enlargement 25 instead of the gutter 3. More particularly, with the tire deflated, the ring is initially assembled on the rim base at an angle thereto with the notch in the base portion of the ring embracing the projection on the annular enlargement of the rim base and one end of the notch in the ring base portion in engagement with the adjacent end of the notch in the flange of the rim base. Then the ring is pried over the flange by prying over peripherally progressive portions of the ring until it snaps over the flange. When the ring has been moved laterally outwardly as by the tire when being inflated, the base portion of the ring and the flange of the rim base, which together form the cooperating retaining means for normally preventing removal of the ring, are opposed and adapted to engage throughout their complete circumferential extents. To remove the ring, the portion thereof opposite the notch therein is moved into engagement with the portion of the bead seat immediately adjacent the annular enlargement, the tire being in deflated condition. Then the portion of the ring in the zone of its notch is pried over the flange by a tool, such as a screw driver, after which peripherally successive portions of the ring may be pried over the flange until the ring may be readily removed by hand.

In the construction of drop-center rim illustrated in Figure 12, the height of the marginal flange 35 above the adjacent tire bead seat 36 of the rim base is less than that of the relatively low flange 24 above the adjacent tire bead seat 22 of the rim base 19. To provide for the application and removal of the endless tire retaining ring 37, the adjacent tire bead seat 36 is formed with the annular groove 38 immediately adjacent the annular shoulder 39 formed upon the rim base and engageable with the inner edge of the ring. The annular groove has a width sufficient to receive the base portion of the tire retaining ring and also a depth sufficient to provide for the assembly and removal of the rim. However, the width of the annular groove is relatively small as compared to the width of the tire bead seat in which the groove is located, or the width of the tire bead seat so that the latter cannot enter the groove. It will be noted that the width of the annular shoulder is substantially equal to that of the inner edge of the base portion of the ring. Both the flange of the rim base and the ring are constructed in the same manner as the flange of the rim base and the ring of Figures 8 to 11 inclusive, to provide for assembly and removal of the ring.

What I claim as my invention is:

1. A wheel rim, comprising an endless rim base and a detachable endless tire retaining ring having cooperating retaining portions normally preventing removal of said ring from said rim base, said retaining portions each being formed with a notch of less depth than its retaining portion and of sufficient depth and extent to permit engagement of the retaining portion of said ring over the retaining portion of said rim base.

2. A wheel rim, comprising an endless rim base formed with a circumferentially extending gutter having a generally radial flange at one side thereof, a detachable endless tire retaining ring formed with a generally radial base portion at the inner side of said flange and having an internal diameter less than the external diameter of said flange, whereby said flange normally prevents removal of said ring from said rim base, said flange and base portion each being formed with a notch of less depth than said flange and base portion and of sufficient depth and extent to permit engagement of said base portion over said flange.

3. A wheel rim, comprising an endless rim base provided with an annular well into which the tire beads can be moved to permit application and removal of the tire to and from said rim base, said rim base being also provided with an endless relatively low flange extending generally radially outwardly from an edge and an annular shoulder immediately adjacent said flange, and an endless tire retaining ring having an internal diameter less than the external diameter of said flange, the portion of said rim base immediately adjacent said shoulder having an external diameter less than the external diameter of said shoulder to permit removal of said ring, said shoulder and ring being provided with cooperating means to prevent creeping of the latter relative to the former.

4. A wheel rim, comprising an endless rim base and a detachable endless tire retaining ring having cooperating radially overlapping retaining portions normally preventing removal of said ring from said rim base, each of said retaining portions being provided with a notch, the notches being of sufficient depth and extent to provide for placing the retaining portion of said ring over the retaining portion of said rim base with the notches extending substantially end to end and with the parts of the retaining portion of said ring adjacent to the notches therein on the inboard and outboard sides of the retaining portion of said rim base whereby the outboard part of the retaining portion of said ring may be forced over the retaining portion of said rim base to the inboard side of said last mentioned retaining portion, the part of each retaining portion at the bottom of the notch in that retaining portion being opposed to the other retaining portion.

5. A wheel rim of that type having an endless rim base provided with a gutter having a flange at one side thereof and an endless tire retaining ring provided with a base portion having an internal diameter less than the external diameter of said flange and extending into said gutter, said flange and base portion each being formed with a notch, the notches being of sufficient depth and extent to provide for placing the base portion of said ring over the flange of said rim base with the notches extending substantially end to end and with the parts of the base portion of said ring adjacent to the notch therein on the inboard and outboard sides of the flange of said rim base whereby the outboard part of the base portion of said flange may be forced progressively over the flange of said rim base into said gutter, the parts of said flange and base portion at the bottoms of their respective notches being opposed to said base portion and flange respectively.

6. A wheel rim of that type having an endless rim base provided with an annular well into which the tire beads can be moved to permit application and removal to and from said rim base, said rim base being also provided with a flange at one edge, and an endless tire retaining ring having an internal diameter less than the external diameter of said flange, said flange and ring each being provided with a notch, the notches being of sufficient depth and extent to provide for placing said ring over said flange with the notches extending substantially end to end and with the parts of said ring adjacent to the notch therein on the inboard and outboard sides of said flange whereby the outboard part of said ring may be forced progressively from adjacent the inboard part of said ring over said flange to the inboard side thereof, the parts of said flange and ring at the bottoms of their respective notches being opposed to said ring and flange respectively.

7. A wheel rim, comprising an endless rim base provided with an annular well into which the tire beads can be moved to permit application and removal of the tire to and from said rim base, said rim base being also provided with a relatively low marginal flange extending generally radially outwardly and a removable endless tire retaining ring mounted upon said rim base and radially overlapping said flange at the inboard side thereof, said flange and ring each being provided with a notch, the notches being of sufficient depth and extent to provide for placing said ring over said flange with the notches extending substantially end to end and with the parts of said ring adjacent to the notch therein on the inboard and outboard sides of said flange whereby the outboard part of said ring may be forced over said flange to the inboard side thereof, said rim base having adjacent said flange an annular groove of a width sufficient to receive said ring and less than the width of the bead of the tire to facilitate removal of said ring.

8. A wheel rim, comprising an endless rim base provided with an annular well into which the tire beads can be moved to permit application and removal of the tire to and from said rim base, said rim base being also provided with an endless relatively low flange extending generally radially outwardly from an edge and an annular shoulder immediately adjacent said flange, and an endless tire retaining ring having an internal diameter less than the external diameter of said flange and located at the inboard side thereof, said flange and ring each having a notch, the notches being of sufficient depth and extent to provide for placing said ring over said flange with the notches extending substantially end to end and with the parts of said ring adjacent to the notch therein on the inboard and outboard sides of said flange whereby the outboard part of said ring may be forced over said flange to the inboard side thereof, the portion of said rim base immediately adjacent said annular shoulder having an external diameter less than the external diameter of said shoulder sufficient to provide for the removal of said ring.

EMIL R. JACOBI.